United States Patent [19]

Morioka et al.

[11] Patent Number: 4,534,927
[45] Date of Patent: Aug. 13, 1985

[54] METHOD AND APPARATUS FOR MANUFACTURING CUPS HAVING A LIP

[75] Inventors: Kazumasa Morioka; Toru Yoshimi, both of Koga, Japan

[73] Assignee: Sekisui Kaseihin Kogyo Kabushiki Kaisha, Nara, Japan

[21] Appl. No.: 526,775

[22] Filed: Aug. 26, 1983

[30] Foreign Application Priority Data

Aug. 31, 1982 [JP] Japan .................. 57-151966
Mar. 11, 1983 [JP] Japan .................. 58-41048

[51] Int. Cl.³ ............................................ B29D 27/00
[52] U.S. Cl. .................... 264/321; 264/285; 264/295; 264/296; 264/339; 264/DIG. 4; 425/383; 425/385; 425/398; 425/817 R
[58] Field of Search .......... 264/321, DIG. 4, 285, 264/295, 296, 339, 320, 322; 425/383, 385, 398, 817 R

[56] References Cited

U.S. PATENT DOCUMENTS

| | | |
|---|---|---|
| 2,797,443 | 7/1957 | Carlson, Jr. .................... 264/53 X |
| 3,096,546 | 7/1963 | Edwards ........................ 264/320 X |
| 3,222,437 | 12/1965 | Schilling ......................... 264/54 |
| 3,291,361 | 12/1966 | Commeyras ................... 229/1.5 B |
| 3,339,005 | 8/1967 | Brown et al. .................. 264/322 X |
| 3,355,536 | 11/1967 | Midgley ......................... 264/322 |
| 3,447,199 | 6/1969 | Trimble ......................... 264/320 X |
| 3,579,737 | 5/1971 | Gerber et al. ................. 264/322 X |
| 3,933,298 | 1/1976 | Ellerbrock et al. ............ 229/5.6 |
| 4,071,598 | 1/1978 | Meadors ........................ 264/296 X |
| 4,150,086 | 4/1979 | Stenhall ......................... 264/339 X |
| 4,281,979 | 8/1981 | Doherty et al. ................ 264/321 X |

FOREIGN PATENT DOCUMENTS

| | | |
|---|---|---|
| 38-24594 | 11/1963 | Japan . |
| 55-48005 | 5/1980 | Japan .................. 264/339 |
| 55-135633 | 10/1980 | Japan .................. 264/339 |

Primary Examiner—Philip Anderson
Attorney, Agent, or Firm—Armstrong, Nikaido, Marmelstein & Kubovcik

[57] ABSTRACT

A method and apparatus for manufacturing a cup formed of a thermoplastic resin foamed sheet material and having a lip, the side wall and bottom of the cup being integrally formed, the lip extending outwardly from the mouth portion of the cup and being bent at its end radially inwardly towards the side wall. The method includes forming a rim extending outward from the mouth portion of the cup and having a downwardly extending end, providing a bending furrow on the outer periphery of the side wall at a level below the rim, and bending the rim, as it is heated, at the bending furrow. The apparatus comprises a mandrel block adapted to hold cups and rotatable and axially slidable, a hot blade or cutting blade movable toward the mandrel block and adapted to form a bending furrow for bending the rim, and a lip forming tool having a lip forming groove adapted to be heated.

15 Claims, 24 Drawing Figures

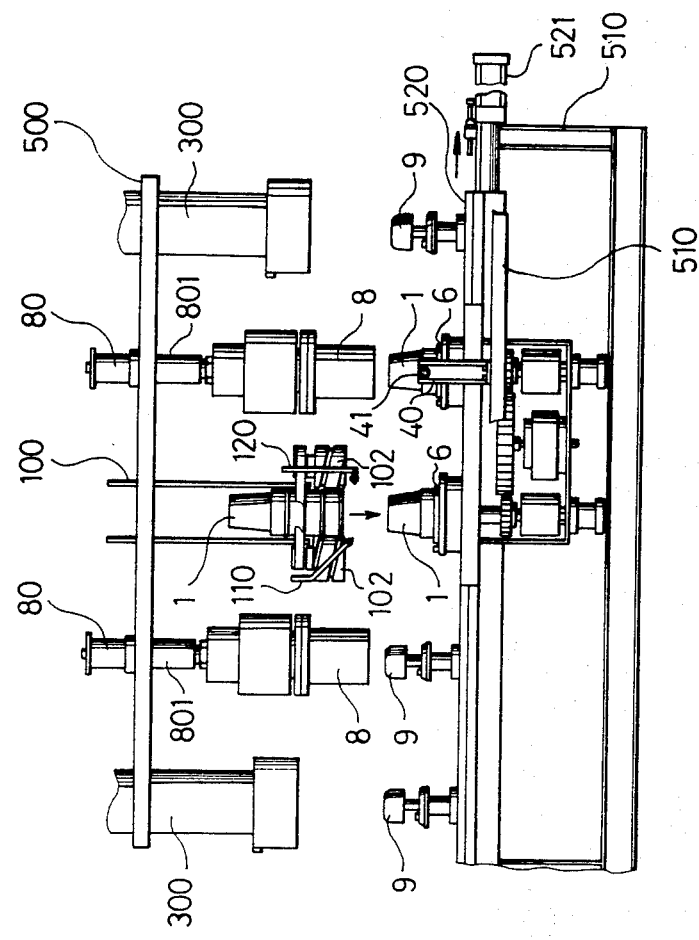

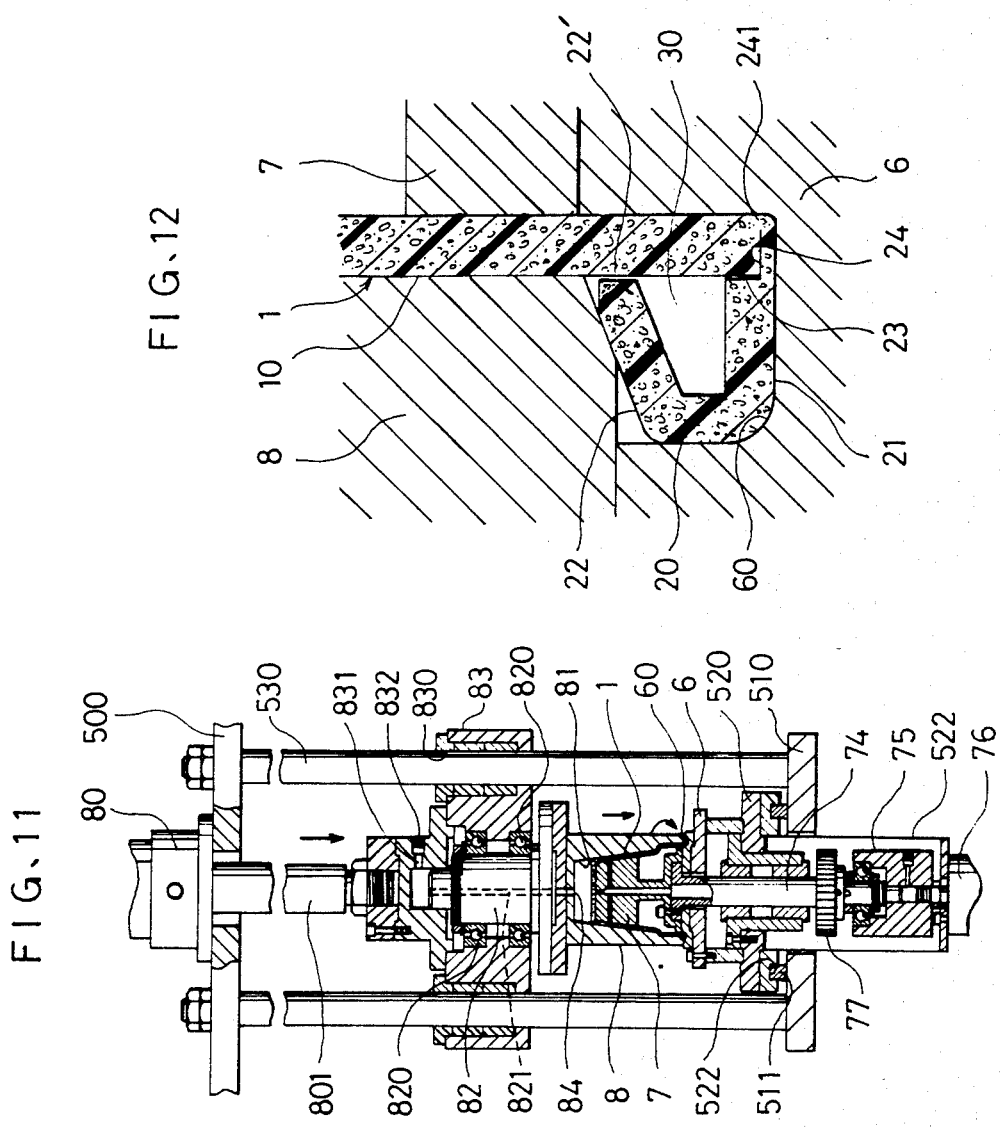

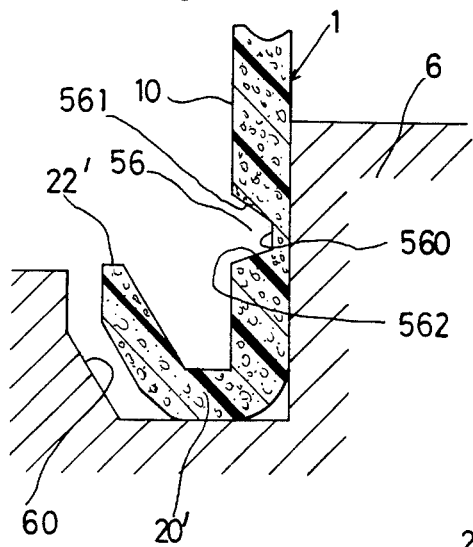
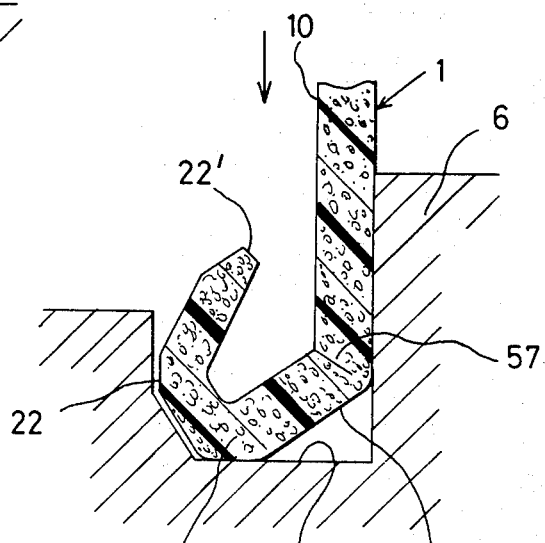
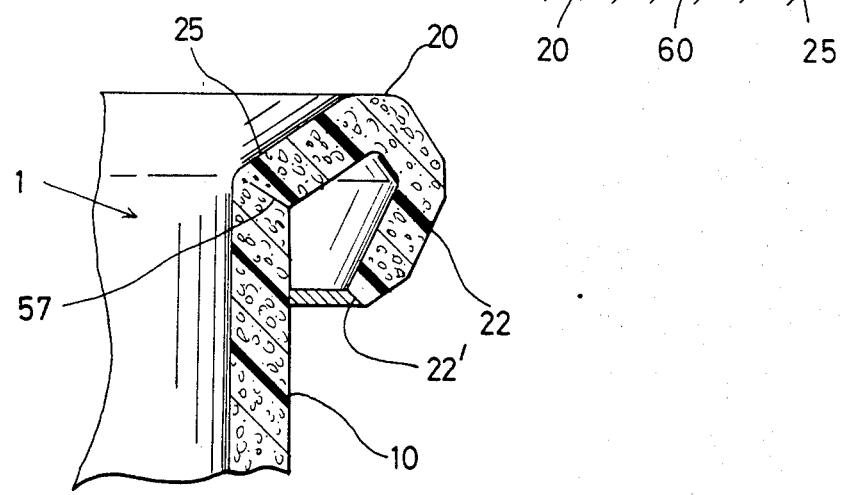

METHOD AND APPARATUS FOR MANUFACTURING CUPS HAVING A LIP

BACKGROUND

1. Field of the Invention

The present invention relates to a method and apparatus for manufacturing cups having a lip. More specifically, the invention relates to a method for forming a lip on a cup formed in one piece by vacuum or press molding from a thermoplastic resin foamed sheet material, such as polystyrene foamed sheet, the lip being such that it extends radially outwardly from the mouth of the cup and is bent at the end thereof radially inwardly towards the side wall of the cup, and an apparatus for forming such lip.

2. Description of the Prior Art

Thermoplastic resin foamed sheet materials have good heat-insulating properties, permit easy molding, and are highly workable into complex curved surface configurations. With such advantages, they have recently been widely used for manufacture into food and beverage containers. Indeed, cups made of such material are largely supplanting paper cups.

Generally, cups of such resin foamed material are manufactured in such a way that a piece of thermoplastic resin foamed sheet is formed into a number of cup blanks arranged in line. The individual cup blanks so formed are trimmed on the outer peripheries thereof.

Thus, each resulting cup is such that it has at its mouth portion a horizontally outwardly extending rim or such a rim having a downwardly extending portion.

In other words, the end of the trimmed rim portion is exposed outwardly of the top of the side wall. This gives the cup an unaesthetic apperance. Moreover, the outwardly extending end of the rim is easily liable to become soiled, which is undesirable from the sanitary point of view. A further disadvantage is that the cup may be easily cracked or torn at its peripheral edge. Another difficulty is that such projection feels unpleasant to the mouth.

The problem of such projection can be solved by bending a portion of the rim further against the side wall so that the end of the trimmed rim portion is not exposed outwardly. In the art of paper cup manufacturing, it is a practice to manufacture cups having a lip formed by bending the end of the rim against the side wall as described above.

In the case of cups made from a resin foamed sheet material, however, the formation of a lip involves considerable difficulty and no satisfactory lip-formation has been achieved.

For example, Japanese Patent Publication No. 38-24594 discloses a lip forming method such that the side wall of a container is heated and simultaneously pressed under rotation against a mold, whereby a lip is formed on the container. This method can be applied to containers formed of non-foamed thermoplastic resin sheet materials. In the case of a container formed of a thermoplastic resin formed sheet material, however, there are problems to be solved. One difficulty is that the material has insignificant elongation, which means poor workability for lip formation. As such, the finished product may have an uneven surface or creases, or less dimensional accuracy. Another difficulty is that because of its high heat-insulation performance such foamed sheet material can hardly be heated in a short time to such a temperature as will permit lip formation. Therefore, said method cannot be implied as it is to cups formed of foamed sheet materials.

In U.S. Pat. No. 3,291,361, it is proposed to form a lip by heating and shrinking the side wall and then bending the rim down against the inside of the container. With such simple heating as disclosed in this prior art patent, however, it is impossible to bend the rim down against the outside of the container, because such bending requiring circumferential elongation of the material. Therefore, such method cannot be employed for the purpose of forming a lip extending outwardly of the cup as intended for by the present invention.

U.S. Pat. No. 3,933,298 discloses a method such that the outer surface of a composite container body wall layer is scored by a scoring tool to define a continuous circumferential scoreline, the body wall layer being bent at the scoreline. If the container is formed of a foamed sheet material, simple scoring by a scoring tool may not achieve sufficient bending because the restoring force of the foamed sheet material will tend to restore the scorelined portion to its prior condition.

OBJECTS AND SUMMARY OF THE INVENTION

The present invention has as its primary object the provision of a method which permits efficient formation of an accurately shaped, dimensionally substantially accurate, and well finished lip on a one-piece cup formed of a thermoplastic resin foamed sheet material, and of an apparatus for practicing the method.

The method comprises the steps of:

(1) forming a cup blank from a thermoplastic resin foamed sheet material, the side wall and bottom of the cup blank being formed integrally with each other at a molding temperature above the softening point of the foamed sheet material, a radially outwardly extending rim being provided at the top of an opening defined by the side wall, the rim extending substantially downwardly at the end thereof, (2) heating an upper portion of the side wall extending above a desired bending line and including the rim to a temperature within a range of temperature above the heat deformation temperature for the material and below the molding temperature, (3) forming a bending furrow for the rim on the outer periphery of the side wall and at a level lower than the rim, along the bending line, and (4) bending the end of the rim on the bending furrow outwardly and down against the side wall.

According to the method of the invention, a bending furrow is formed on the outer periphery of the side wall and at a level lower than the rim along a desired bending line, and the end of the rim is bent at the bending furrow down toward the side wall. Therefore, bending can be very smoothly performed along the bending furrow, a location where a most larger deformation is involved during the lip forming operation and which makes a base point for bending operation, lip formation being thus very much facilitated. As such, the method according to the invention permits efficient production of cups formed of a resin foamed sheet material having a lip, the manufacture of which has been considered extremely difficult in the art, with assured neatness of finish.

The above mentioned two steps (2) and (3) can be performed in either sequence or simultaneous.

It is to be understood that the bending furrow in the invention can comprise a linear notch or a bending groove having a certain width and that it may be formed by means of either a cutting edge blade or a hot blade, and that the bending line in the invention is the circumferential portion about the cup where bending is to take place.

The apparatus in accordance with the present invention permits efficient practicing of the method of the invention and is defined as follows:

An apparatus for manufacturing cups having a lip, including means for forming lip of a cup blank made from a thermoplastic resin foamed sheet material and having a side wall and a bottom integrally formed therewith and a radially outwardly extending rim provided at the top of an opening defined by the side wall, said means comprising cup supply means for feeding cup blanks, one at a time, to cup holding means for holding each cup blank from the cup supply means, said cup holding means being rotatable and axialy slidable as it holds the cup blank, bending-line forming means movable toward the cup blank held by the cup holding means and adapted to form a bending furrow on the outer periphery of the side wall of the cup blank and at a level lower than the rim, lip forming means disposed in opposed relation to the rim of the cup blank held by the cup holding means and having a lip forming groove adapted to receive the rim of the cup and provided with heating means, and cup removal means for removing the cup from the cup holding means when a lip has been formed on the cup.

According to the above said arrangement of the invention, a bending furrow is formed by a bending line forming means while the cup holding means and the cup, as held thereby, are rotated. This permits easy and accurate formation of a bending furrow, the subsequent bending operation being thus well facilitated.

In the stage of forming operation, the cup held by the cup holding means is caused to slide axially while being kept in rotation, and the rim of the cup is bent by being pressed against the lip forming groove so that a lip is formed. As such, the pressing force is evenly applied to the entire circumference of the cup and, accordingly the configuration of the lip being formed can be well stabilized with good working efficiency being assured.

Further, the fact that the lip forming groove is provided with heating means permits heating of the upper portion of the side wall above the bending line and including the rim of the cup to a temperature suitable for bending operation, whereby the bending operation may be performed at ease.

Since the apparatus of the invention includes cup supply means and cup removal means, the entire lip forming process may be automated or continuously operated. Thus, the apparatus of the invention facilitates manufacture of cups on a mass or continuous production basis.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 5 to 19 illustrate operation of relevant parts of the apparatus, and cup being worked, in the sequential order of stage involved;

FIG. 5 is a front view showing the relevant part of one unit of apparatus at cup blank supply stage;

FIG. 6 is a vertical sectional view showing key parts of a mandrel block;

FIG. 7 is a front view showing movement of apparatus to bending-line forming stage;

FIG. 8 is a vertical view in section showing the mandrel block at bending-line forming stage;

FIG. 9 is an enlarged sectional view showing a forming groove at said stage;

FIG. 10 is an enlarged sectional view showing a bending groove formed at said stage;

FIG. 11 is a vertical sectional view showing a cavity block at bending stage;

FIG. 12 is an enlarged view in section showing the forming groove at said stage;

FIG. 13 is a section showing cavity block at cup removal stage;

FIG. 14 is a front elevation showing operation of apparatus at cup delivery stage;

FIG. 15 is a front elevation showing operation of apparatus at collection stage;

FIG. 16 is a partially cut-away view in front elevation showing a completed cup;

FIG. 17 is an enlarged sectional view showing the lip of the completed cup;

FIG. 18 to 20 illustrate modifications by way of example;

FIG. 18 is a section showing the forming groove at the end of bending-groove forming operation;

FIG. 19 is a sectional view showing the forming groove at bending stage;

FIG. 20 is an enlarged section showing the lip of a completed cup;

FIG. 21 is an enlarged view in section showing key parts of a cup after notch formation;

FIG. 22 is a section showing a forming groove prior to the stage of bending;

FIG. 23 is a sectional view showing the forming groove after completion of bending; and FIG. 24 is an enlarged sectional view showing the configuration of a lip formed.

DETAILED DESCRIPTION OF PREFERRED EMBODIMENTS

The present inventive-method and apparatus will be further described each of the stages of operation followed.

Cup forming stage

Figure 1:
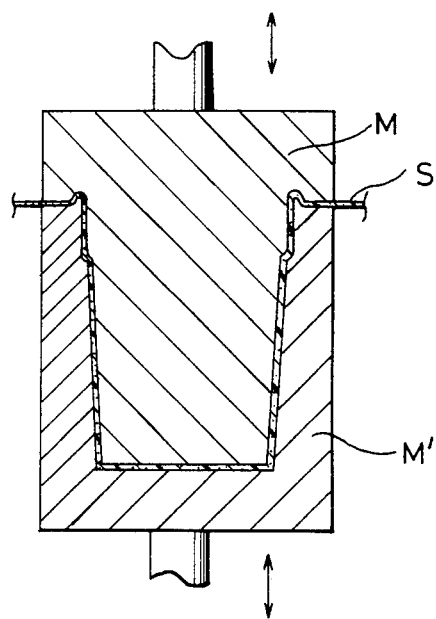
FIG. 1 is a sectional view showing the stage of cup forming.

A cup blank 1 used for the purpose of the invention is formed from a thermoplastic resin foamed sheet material S, e.g., polystyrene foamed sheet, by heating the foamed sheet material S to a molding temperature above its softening point and subjecting same to deformation along a molding tool consisting of a pair of dies M, M', male and female, as illustrated in FIG. 1. The resulting cup blank having a side wall and a bottom integrally formed therewith.

For formation of a cup blank 1, a polystyrene foamed sheet material having a density of 0.08-0.7 g/cm$^3$, for example, may be used advantageously. Polystyrenes suitable for such foamed sheet material include styrene polymers produced by polymerization of vinyl aromatic monomers such as styrene, vinyltoluene, isopropyl styrene, α-methylstyrene, nuclearmethylstyrene, chlorostyrene, or tribasic butyl styrene, or styrene copolymers produced by copolymerization of styrene monomer and 1.3-butadiene, alkyl acrylate such as butyl acrylate, ethyl acrylate, or 2-ethylhexyl acrylate, alkyl methacrylate such as methyl methacrylate, butyl methacrylate, or 2-ethylhexyl methacrylate, acrylonitrile, vinyl acetate, α-methylethylene, divinylbenzene, dimethyl maleate, or diethyl maleate, and containing more than 50% by weight of styrene monomer. Beside those of above named polystyrenes, sheets of such thermoplastic foamed resins such as polyethylene and polypropylene may be used. Also available for use are sheets of foamed resins produced by graft polymerization of styrene monomers with olefin resin, such as polyethylene or polypropylene, which constitutes a nucleus, and foamed sheets of resins produced by blending polystyrene resins with polyolefin resins.

The foamed resin sheets may be of a single layer, or may be such that a non-foamed film of a resin such as high-impact polystyrene, polypropylene, polyethylene or the like is laminated in one or more layers on one or both sides of any such foamed sheet.

The thickness of the foamed sheet may be within the range of 0.5-3.0 mm (average product thickness). Non-foamed film used for lamination may be 5-120μ thick (product thickness).

Molding temperature for the foamed sheet material may vary depending upon the material and configuration of the cup blank 1 being molded. If foamed polystyrene sheet material is used, molding should be carried out at 120°±5° C.

Vacuum forming, press molding, or any other conventional sheet molding method may be employed at choice.

Figure 2:
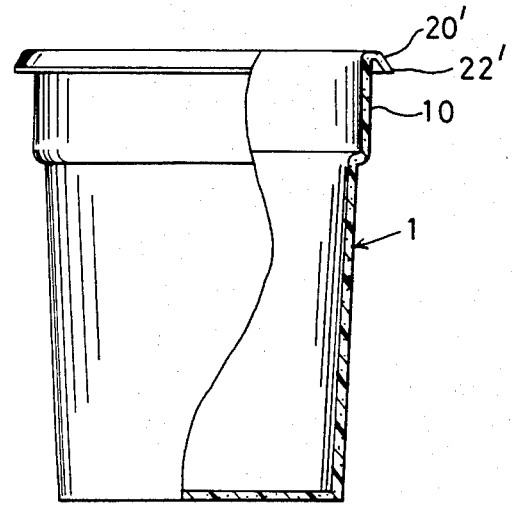
FIG. 2 is a partially cut-away view in front elevation showing a formed cup blank.
Figure 3:
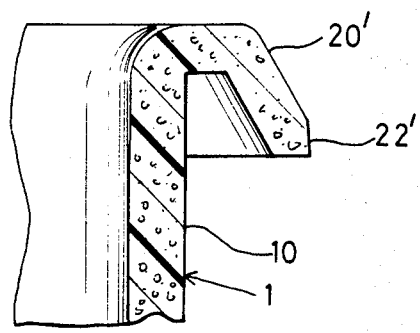
FIG. 3 is an enlarged sectional view showing the rim portion of the cup blank.

As FIGS. 2 and 3 illustrate, the cup blank 1 as formed is of substantially cylindrical shape with its side wall being upwardly flared having the upper portion 10 thereof is substantially vertically straight. There is a step formed between the upper portion 10 and the upwardly flared lower portion of the side wall so that a plurality of cups 1 may be easily stacked one over the other or removed one after another from such a stack. The overall configuration of the cup is not limited to such elongate shape suitable for beverage service as shown. The cup may be of laterally broader shape like a bowl or otherwise. For practical purposes, however, the height h to mouth diameter d ratio should be h/d=0.4-1.2.

At the top of the opening defined by the side wall, the cup 1 has a radially outwardly extending hook-shaped rim 20', the end 22' of the rim 20' being circumferentially trimmed in such a manner that if faces obliquely downward.

The configuration of the rim 20' is not limited to the one as shown, but it may be varied freely inasmuch as it is bent or curved in a hook-shaped pattern. For example, it may be substantially U-shaped, or of angular or arcuate shape. It is to be noted that the rim 20' should be so formed that its end 22' faces obliquely downward or substantially downward.

Figure 4:
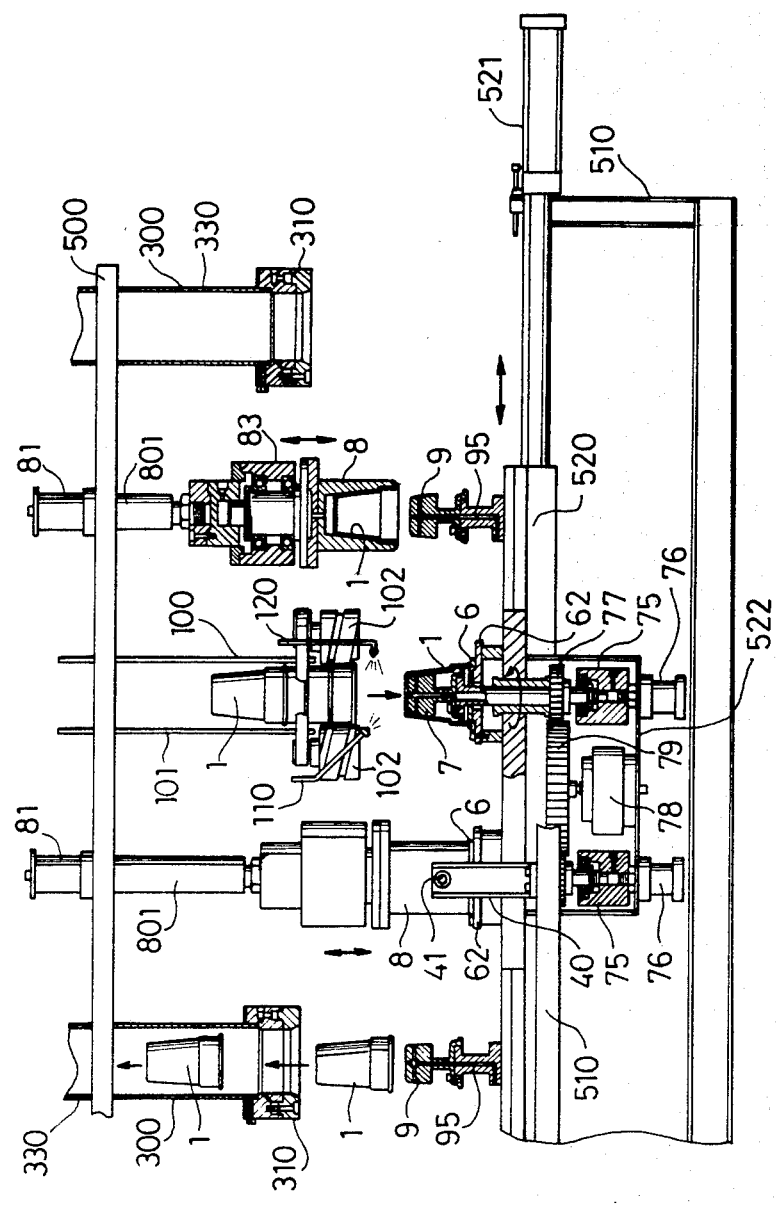
FIG. 4 is an enlarged schematic view in section showing key parts of one unit of apparatus according to the invention.

The rim 20' of the above-described cup blank 1 is further bent to form a lip such that the end 22' of the rim 20 is bent toward the side wall. The apparatus of the invention which is designed for forming such a lip on the cup blank is schematically shown in FIG. 4.

The apparatus shown is adapted to form lips on a plurality of cup blanks 1 one at a time. On the upper side of the arrangement there is disposed a spiral feeder 100 for feeding cup blanks 1. Cavity blocks 8, 8 which act as cup removal means are disposed respectively at the lefthand sides of the spiral feeder 100, and air chuters 300, 300 for collecting cups 1 are disposed, one at lefthand side and the other at righthand side, outwardly of the cavity blocks.

The spiral feeder 100, the two cavity blocks 8, 8 and the two air chuters 300, 300 are taken as one unit. A plurality of such units may be arranged together. In that case, an air chuter 300 interposed between each two adjacent units may be commonly used for the adjacent units.

The individual spiral feeders 100, cavity blocks 8, and air chuters 300 are supported by a stationary beam 500 located above the apparatus, to which beam they are fixed. The cavity blocks 8 are upwardly and downwardly movably fixed under the stationary beam 500 through cylinder mechanisms 80.

Under the above described group of components there is provided a moving table 520 which is horizontally movable on a stationary table 510 along the row of said components. The moving table 520, actuated by a cylinder mechanism 521, is adapted to reciprocate over a distance corresponding to that between each adjacent spiral feeder 100 and cavity block 8.

On the moving table 520 there are disposed a pair of lip forming tools 6, 6 for forming a lip and mandrel blocks 7, 7 for holding cups. Product receiving blocks 9, 9 are disposed outwardly of the lip forming tools 6, 6.

Along with movement of the moving table 520, the lip forming tool 6 and mandrel block 7 are moved from a position under the spiral feeder 100 to a position under the cavity block 8, and the product receiving block 9 is moved from the position under the cavity block 8 to a position under the air chuter 300.

The basic arrangement of one unit of the apparatus has now been described. The manner of operation of the apparatus is same for every unit of the apparatus, if a plurality of units are installed. Hereinafter, therefore, one unit portion of the arrangement shown in FIG. 4 will be described in detail according to the sequence of operation.

Cup supply stage

Figure 5:
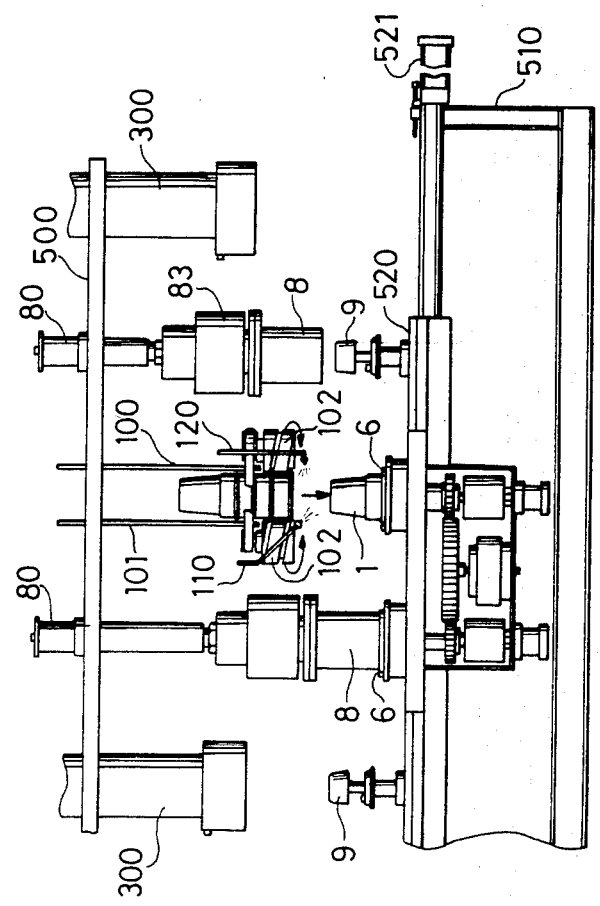

As can be seen from FIG. 5 which shows the arrangement of the apparatus in front elevation, one mandrel block 7 and one lip forming tool 6 are disposed (both referring to the right-hand-side ones in the figure) under the spiral feeder 100.

The spiral feeder 100 has at the center thereof a guide portion 101 for stacking a plurality of cup blanks 1, with a pair of screws 102 disposed at both sides of the guide portion 101, so that cups 1 are dropped one by one from the guide portion 101 as the screws 102 rotate.

A blow-off nozzle 110 is adapted to blow pressure air downwardly of the center of the guide portion 101 to downwardly urge cups 1 falling from the guide portion 101 so that accurate and quick drop of each of the cups 1 is assured.

A lubricant spray nozzle 120 is adapted to apply a lubricant such as silicone solution to the rim 20' of each cup blank 1.

The lubricant serves to reduce friction between the rim 20' and the forming groove 60 of the lip forming tool 6 in the bending stage to be described hereinafter, thereby imparting better slide effect to the rim 20'. Since the rim 20' is pressed against the forming groove 60 while being rotated, absence of lubricant may lead to development of creases on the rim 20' or torsion of the rim 20' in the direction of rotation thereof under the force of friction caused between the rim 20' and the forming groove 60.

The presence of the lubricant between the rim 20' and the forming groove 60 will reduce friction and smoothen slide movement, thus eliminating the problem of crease occurrence or the like. In order to ensure smooth bending operation and satisfactory lip finish, therefore, lubricant application is necessary. Such lubricant also serves to ensure effective transfer of heat from the forming groove 60 to the rim 20' in the stage of heating.

Agents having an insignificant coefficient of friction are suitable for use as the lubricant, such as surface active agents and paraffin, as well as silicone solution. To apply the lubricant to the rim 20', nozzle spraying or coating may be used. It is also possible to pour the lubricant into the clearance between the rim 20' and the forming groove 60 through a lubricant feed hole which may be provided in the inner surface of the forming groove 60.

In place of the spiral feeder 100, a conventional conveyor mechanism may be employed as means for feeding cups 1, provided that it can be adapted to drop down the cups 1, one by one.

Under the spiral feeder 100 are disposed a mandrel block 7 and a lip forming tool 6. Cup blanks 1, as fed by dropping from the spiral feeder 100, are fitted over the mandrel 7.

Installed on the moving table 520, the mandrel block 7 and lip forming tool 6 move horizontally along with the moving table 520. As can be best seen in FIG. 8, the moving table 520 is provided with rail grooves 522 which are in engagement with two rails 511 laid on the stationary table 510, being adapted to slide horizontally through the engagement of the rail grooves 522.

The construction of the mandrel block 7 and lip forming tool 6 will be described in detail with reference to FIG. 6.

The lip forming tool 6 is mounted on a heating table 62 fixedly placed on the moving table 520 through a cylindrical body 61 and which is adapted to perform heating through electric heater means. A forming groove 60 is provided on the tool 6 formed in a circlar pattern which is adapted to receive the rim 20' of the cup blank 1 so that the rim 20' is bent by being pressed along the forming groove 60. The forming groove 60 has a sectional configuration compatible with the configuration of the rim 20' and that of a lip to be formed. In the present embodiment, the forming groove 60 has a rectangular section in which the inner periphery and bottom of the groove 60 are substantially at right angles relative to each other. The lip forming tool 6 is constructed so that its surface on the inward side of the forming groove 60 is at a slightly higher level relative to its surface on the outward side of the groove 60.

The heating temperature of the forming tool 6 through the heating table 62 should be set at approximately 104°±5° C. adjacent the forming groove 60. This temperature is to be taken as a temperature which permits bending of the rim 20' of the cup blank 1. More specifically, the temperature is such that the upper portion of the side wall of the cup blank 1, including the rim 20', can be heated to a temperature range of above the heat deformation temperature and right below the molding temperature of the cup blank 1.

The mandrel block 7 has a substantially truncated coneshaped head portion 70 which is adapted to abut the interior of the cup 1 at the bottom and adjacent portion thereof, and a disc-shaped base portion 71 which is adapted to abut the interior of the cup 1 at the upper end portion thereof adjacent the rim 20'. The head portion 70 and base portion 71 are integrally connected to each other by a center shaft portion 72. That is, the mandrel block 7 is adapted to engage the cup 1 by abutting the interior thereof at two portions, i.e., the bottom and the upper end adjacent the rim 20'. Such partial abutment is sufficient to support the cup 1 and protect the rim 20' against deformation during bending operation. A modified type of mandrel block 7 may be made such that its entire outer periphery is adapted to engage the inner surface of the cup 1.

The head portion 70 of the mandrel block 7 has, at the center of its top and at a plurality of locations on its side wall periphery, vacuum adsorption holes 73 communicating with a vacuum passage 730 provided inside the mandrel block 7, so that the cup 1 brought in engagement with the mandrel block 7 is held and secured through adsorption.

The arrangement of vacuum adsorption holes 73 is not limited to the one shown and variations may be made without departing from the scope of the invention. In a modified embodiment, the vacuum adsorption holes 73 may be provided only on the side wall or top of the mandrel block 7, if they can hold and secure the cup 1 by adsorption. In the present instance, vacuum pressure in the vacuum adsorption holes is set at approximately 76–60 mmHg.

To the bottom of the mandrel block 7 there is integrally connected a mandrel shaft 74 by bolts 740. The mandrel shaft 74 extends through both the forming tool 6 and the heating table 62 and further into a box-shaped mounting frame 522 fixed to the underside of the moving table 520. The shaft 74 is rotatably supported, through bearings 750, in a bearing block 75 provided in the mounting frame 522.

A through-hole 741 extends centrally through the mandrel shaft 74, communicating at the upper end thereof with the vacuum passage 730 inside the mandrel block 7 and at the lower end thereof with a vacuum pipe connection 752 provided on the outer periphery of the bearing block 75, via a vacuum passage 751 in the bearing block 75. A vacuum pipe suitably connected to a vacuum source is connected to the vacuum pipe connection 752, so that the mandrel block 7 is enabled to perform its vacuum adsorption function.

A rod 760 of the cushioning cylinder 76 is connected to the bottom of the bearing block 75. The air cushioning cylinder 76 has its body portion fixed to the underside of the mounting frame 522, so that the bearing block 75, mandrel shaft 74, and mandrel block 7, all disposed above the cylinder 76, are integrally connected as one up-and-down movable assembly.

On the mandrel shaft 74 and at an upper portion of the bearing block 75, a gear 77 is securely fitted for rotatiing the mandrel block. The gear 77 is in engagement with a drive gear 79 for rotary actuator 78 mounted in the mounting frame 522.

The rotary actuator 78 actuates the drive gear 79 to rotate through introduction of pressure air. The drive gear 79 turns through a rotation angle of about 120° to rotate the mating gear 77, and accordingly the mandrel block 7 connected thereto, more than one turn. The number of turns or angle of rotation of the mandrel block 7 is variable depending upon the angle of rotation of the drive gear 79.

Figure 6:
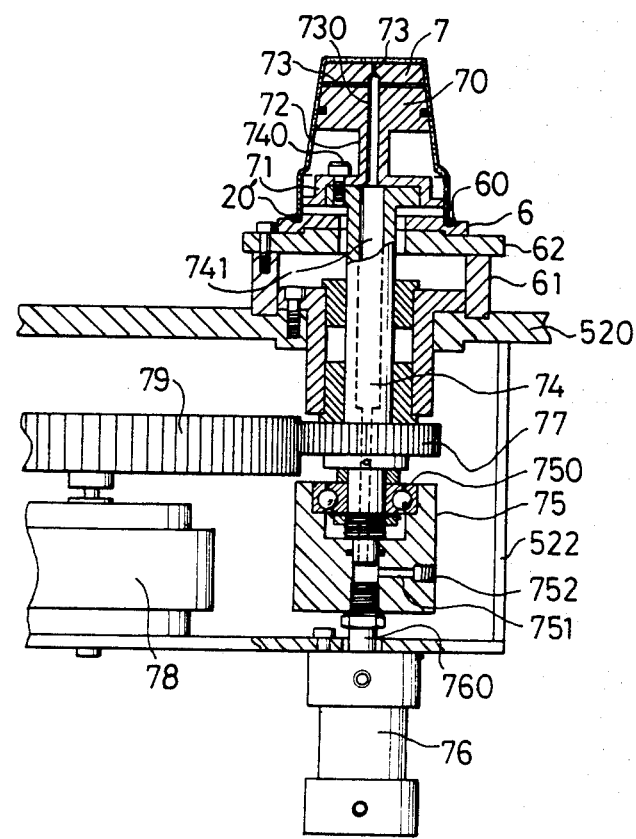

In the present instance, one rotary actuator 78 is disposed between two sets, right and left, of mandrels 7 and lip molding tools 6 so that the drive gear 79 mounted on the rotary actuator 78 is in engagement with two mandrel-rotating gears 77, 77, right and left, for simultaneous rotation thereof (see FIG. 6).

The drive gear 79 and the gear 77 are designed so that the latter is in mesh with the former for rotation whether it is at an elevated position or at a lowered position as a result of its vertical movement along with the up and down movement of the mandrel shaft 74.

When cups 1 are supplied from the spiral feeder 100 to the mandrel block 7, the rod 760 of the air cushioning cylinder 76 is moved to an elevated position to lift the mandrel block 7, thus there being formed a gap (of about 3 mm, for example) between the bottom of the mandrel block 7 and the top of the lip forming tool 6. At that moment, the rim 20' of the cup 1 fitted on the mandrel 7 is seen as received into the forming groove 60.

The forming groove 60 is heated by the heating table 62, and accordingly the rim 20' and adjacent portion of the cup 1 is heated by way of preheating for facilitating the stage of lip formation which will be described hereinafter.

Movement to bending work position

As can be seen from the general view of a unit apparatus in FIG. 7, the moving table 520 is moved to the right as seen in the figure, and the mandrel block 7 in engagement with the cup 1 and the lip forming tool 6 are positioned under the cavity block 8 on the right. Whilst, the mandrel block 7 and lip forming tool 6 on the left side are positioned under the spiral feeder 100 so that supply of cups from the spiral feeder 100 to the mandrel block 7 is initiated. It is noted that in the subsequent stages as well, operation of the left-side part of the unit apparatus will progress with some time lag behind that of the right-side counterpart.

Bending-line forming stage

Figure 8:
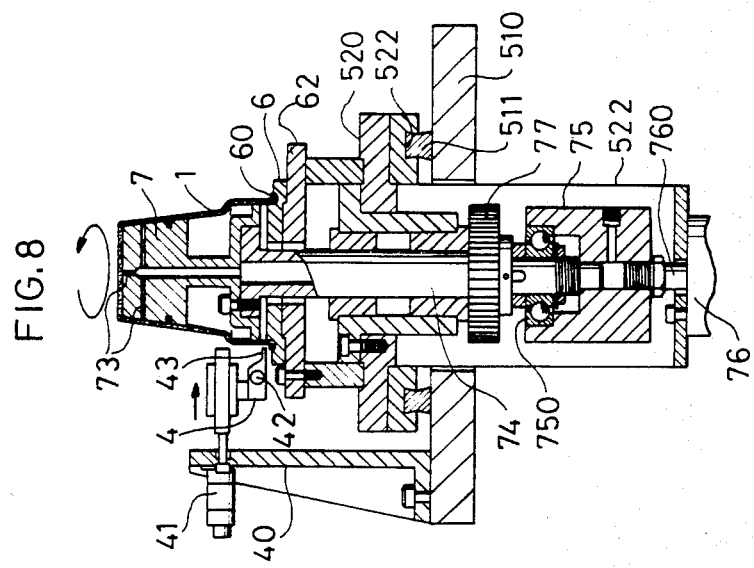

Referring to FIG. 8, in which the mandrel block 6 is illustrated in section, an upwardly extending hot-blade mounting base 40 is disposed on the stationary table 510, outwardly of the moving table 520. An air cylinder 41 is mounted adjacent the upper end of the mounting base 40. At the forward end portion of the air cylinder 41 is fixed a hot blade 4 which serves as bending-line forming means, the front end 43 of the hot blade 4 being horizontally movable for access toward the mandrel block 6. The hot blade 4 has a sheathed heater 42 embedded therein for heating up the hot blade 4. The front end 43 of the hot blade 4 is shaped in rectangular or other pattern as required according to the sectional configuration of the bending groove (to be further described hereinafter) along the bending line.

The hot blade 4 is moved toward the mandrel block 7 by driving the air cylinder 41 while the mandrel block 6 is rotated under the drive force of the rotary actuator 78. The front end 43 of the hot blade 4 is pressed against the outer periphery of the side wall of cup 1 at a level above the rim 20' as seen. The blade front end 43 is then brought in abutment with the side wall over the entire outer periphery thereof since the mandrel block 7 is rotating, a bending groove 50 being thus formed on the entire periphery at said level of the cup 1.

Figure 9:
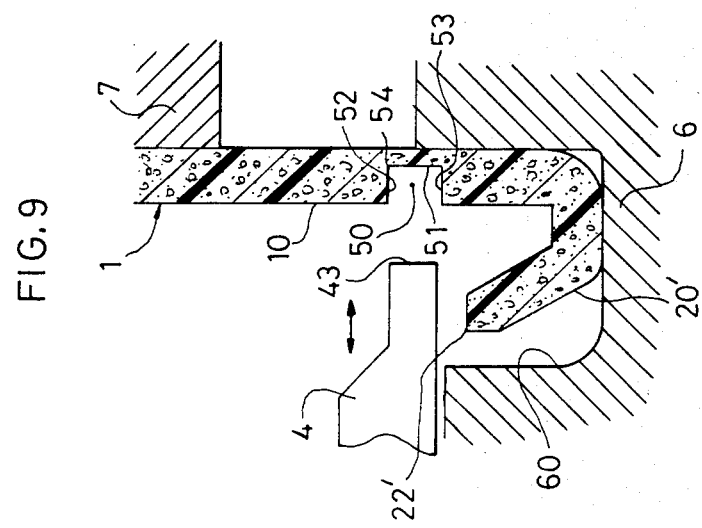

More specifically, referring to FIG. 9 showing an enlarged view, the front end 43 of the hot blade, which is of rectangular shape, is pressed against the outer peripheral surface of side wall of the cup 1 at a level slightly above the end 22' of curved portion of the rim 20' to melt-form a bending groove 50.

In the present instance, the front end 43 of the hot blade 4 is rectangle-shaped with the following dimensions: 1.3 mm thick, 4 mm deep, and 40 mm wide.

The heating temperature of the hot blade 4 is preferably at or above the melting temperature of the foamed sheet material of which the cup 1 is formed, e.g., 280° C. However, a temperature range of 250° C. to 280° C. may be conveniently employed. If so desired, temperatures of 250° C. to 300° C. may be applied as well.

Figure 10:
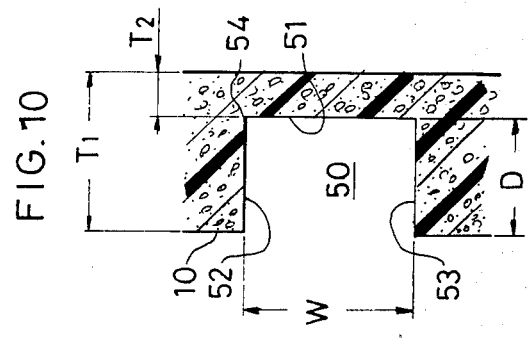

Next, the configuration of the bending groove 50 will be described in detail with reference to FIG. 10. Groove width W should be same as or slightly larger than mean depth D of the groove. More specifically, the groove width W is preferably 0.1–0.3 mm larger than the groove depth D.

It is desirable to preset the thickness $T_2$ of the bottom wall 51 of the bending groove 50 to the extent that the bottom wall is thick enough to prevent the upper side wall portion 10 from breaking during the step of bending (which is to be further described hereinafter). Provided, however, that if the sheet material of which the cup 1 is formed comprises a foamed sheet and a non-foamed sheet laminated thereon, no part of the foamed material portion may be reserved for bottom wall 51.

The required dimensions of a bending groove 50 should be: where cup side-wall thickness $T_1 = 0.5 \sim 3.0$ mm, groove width $W = T_1 + 0.1 \sim 0.3$ mm, groove bottom thickness $T_2 = T_1 - 0.2 \sim 1.0$ mm.

There may be cases where a small radius is formed at corners of the bending groove 50 where the bottom 51 and side walls 52, 53 are connected at substantially right angles. It is also permissible that the bottom 51 may be sloped so that the depth of the bending groove 50 is less deep on the upper side of the cup than on the lower side.

The configurations of the bending groove 50 can be determined by setting the configuration of front end of the hot blade 4 as required. In practice, however, bending groove 50 is formed through hot melting, and therefore, a groove configuration which is in complete agreement with the configuration of the hotblade front end 43 cannot be formed. Some difference between the two is tolerable if the above conditions as to the relationship between groove width W and groove depth D are satisfied. The configuration of the hot-blade front end 43 may be formed by taking into consideration such tolerable errors.

With the bending groove 50 as a bending line, bending is carried out in manner as hereinafter described, the corner between the bottom 51 and the side wall 52 on the lower-end side of the cup being taken as a base line.

Beside above described rectangular bending groove which is hot-melt formed, it is possible to employ various other groove configurations, such as U-shaped, V-shaped, trapezoidal grooves, or lineal notches, whether hot-melt formed or mechanically cut. If a groove or notch is to be formed by cutting, a cutting blade may be used instead of a hot blade 4.

Whichever of the above grooves or notches may be employed, it is important that the bending furrow should be formed so that it is more easily bendable than any other part of the side wall 10 and can be accurately bent and deformed during the stage of pressing (which is to be described hereinafter).

Bending stage

Description is made with reference to FIG. 11 showing the mandrel block 7, lip forming tool 6, and cavity block 8 in section.

The cavity block 8 has a recess 81 adapted to fit over the cup 1 along the outer peripheral configuration thereof. On the top of the cavity block 8 there is mounted a rotating shaft 82 which is rotatably suspended from a vertically movable member 83 through a bearing 820. The vertically movable member 83 is connected at its upper end to one end of a rod 801 of a cylinder mechanism 80 so that the member 83 and the cavity block 8 are moved up and down along with the movement of the cylinder mechanism 80. At location adjacent its right and left side ends, the vertically movable member 83 has guide holes 830 bored therethrough. Through each of the guide holes 830 there slidably extends a guide support 530 which hangs from an overhead beam 500 extending down to a stationary table 510, so that the horizontally movable member 83 and cavity block 8 can be moved up and down properly without run-out to right or left.

At the interior bottom of the recess 81 of the cavity block 8 is a vacuum adsorption hole 84 which communicates with a vacuum passage 831 through center hole 821 of rotating shaft 82. The vacuum passage 831 leads to the outer periphery of the vertically movable member 83 through the interior thereof. On the outer periphery of the vertically movable member 83 at which the vacuum passage 831 terminates, a vacuum pipe connection 832 is provided to which a vacuum pipe is connected as required which communicates with a vacuum source.

The cylinder mechanism 80 is actuated to lower the cavity block 8 so that the latter is fitted over the cup 1 which is in engagement with the mandrel block 7. Thus, cup 1 is held in position in such way that its inner and outer peripheries are interposed between the mandrel block 7 and the cavity block 8.

Through vacuum suction by vacuum suction holes 84 in the cavity block 8 the cup 1 and the cavity block 8 are brought in close contact, whereby they become integrally rotatable.

Then, the mandrel block 7, cup 1, and cavity block 8 are further lowered until the underside of the mandrel block 7 abuts the top of the lip forming tool 6.

Meanwhile, the mandrel 7 is kept in rotation through the operation of the rotary actuator 78, so that the cup 1 in engagement with the mandrel 7 and the cavity block 8 engaging the cup 1 through vacuum suction are integrally rotated.

The process of lip forming with the rim 20' will not be explained with reference to FIG. 12 in which an enlarged sectional view if presented.

As the cup 1 is lowered, the rim 20' is pressed into the forming groove 60 so that the entire rim 20' is bent outwardly along a base line 54 which consists of a corner line defined by the lower side wall 52 of the bending groove 50 and the bottom wall 51 of the groove 50. The side wall 52 is brought in opposed relation to the bottom wall 51, and similarly the outer surface of the upper side wall portion 10 and the side wall 53 are brought in opposed relation; thus, a line 23 and another line 24 are formed to constitute a L configuration together.

Accordingly, at the upper end of the side wall 10 is formed a projection 21 extending outwardly at substantially right angle to the side wall 10 through a preserved thin wall portion 241. Further, a curved portion 22 is formed which extends downwardly of the projection 21 in a hook-shape pattern. The end 22' of the curved portion 22 abuts the outer surface of the upper side wall portion 10 in opposed relation thereto or faces said outer surface with some clearance therebetween. The projection 21 and the curved portion 22 constitute a lip 20, and between the lip 20 and the upper side wall portion 10 there is present a cavity 30 defined by them.

The configuration of the curved portion 22 is substantially same as that of the curved portion as initially formed on the rim 20'. However, since the rim 20' is pressed along the groove configuration of the forming groove 60 and is further pressed by the bottom of the cavity block 8, the resulting curved portion 22 involves a further deformation effected on the initial curved configuration. Therefore, the cavity block 8 has at its bottom an inner peripheral edge formed corresponding to the configuration of said curved portion 22.

Thus, the rim 20' of the cup 1 has now been worked into a lip 20.

Lines 23, 24 on the lip represent lines produced by face-to-face engagement of same foamed sheet material. If bending is carried out while the hot-melt portion produced during melt-forming of the bending groove 50 is still in softened condition and if the lower side wall 52 and bottom wall 51 of the bending groove 50 are heat-fused, line 24 is completely joined and there is no possibility of the bent portion regaining its previous condition. This practice is effective in keeping the configuration of the lip 20 in order. A similar effect may be obtained by joining the lower side wall 52 and bottom 51, or upper side wall 53 and upper side-wall portion 10, with adhesive. In this case, however, adhesive coating stage and coating means are additionally needed.

It is noted that prior to said bending stage the side wall portion of the cup 1 above the bending line or bending groove 50, including the rim 20', must be heated to a temperature higher than the heat deformation temperature and lower than the molding temperature for the cup 1.

The temperature for heating should be set at such a range as will permit sufficient elongation deformation during lip forming operation through bending of the rim 20' at the bending groove 50.

Temperatures below the heat deformation temperature do not permit effective bending and are therefore unsuitable for the purpose. In order to ensure sufficient deformation, heating to temperatures above the softening point is desirable.

The upper limit of heating temperatures should be a temperature just below the molding temperature. It is noted, however, that at temperatures close to the molding temperature the foamed sheet material may regain the unoriented condition prior to its being formed into the cup 1, thus being liable to contraction. As such, it is likely that the rim 20' will be deformed to the extent that deformation of a satisfactory lip 20 cannot be expected. There is also a limitation from the standpoint of heating temperature control. In practice, therefore, heating is effected preferably at a temperature substantially 10° C. lower than the molding temperature.

The heating temperature range may vary according to the characteristics of the foamed sheet material of which the cup 1 is formed. For example, where the material is polystyrene foamed sheet, the heat deformation temperature range is 77°-85° C. the softening point is 97° C., and the molding temperature is usually 120°±5° C.

Removal stage

Figure 13:
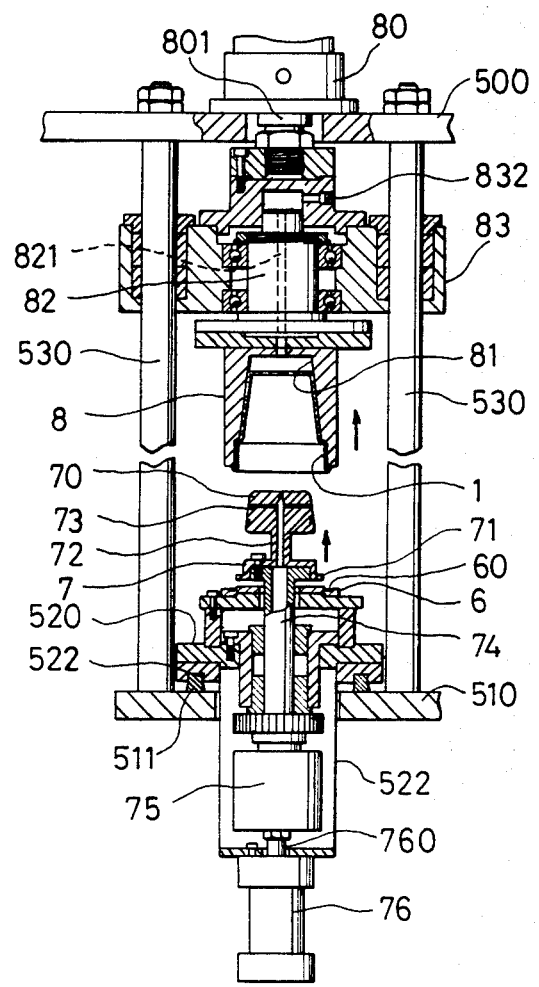

Operation is explained with reference to FIG. 13 in which a sectional view is presented.

First, the mandrel block 7 and cavity block 8 are elevated to a resetting position of the mandrel 7, through operation of the air cushion cylinder 76 and cylinder mechanism 80. The lip 20 of the cup 1 is then released from the forming groove 60.

Next, vacuum suction of the cup 1 by the suction holes 73 in the mandrel block 7 is removed. The cavity block 8 is elevated through operation of the cylinder mechanism 80 while the cup 1 is held under suction by the vacuum suction holes in the cavity block 8. The cup 1 is moved upward along with the cavity block 8, being thus removed upward from the mandrel block 7.

For the purpose of removing the cup 1 from the mandrel block 7, it may be advantageous to blow up pressure air from the vacuum suction holes 73 of the mandrel block 7; this will facilitate cup removal. If this is to be done, however, it is necessary to connect a pressure air pipeline to the vacuum pipe connection 752 in the bearing block 75, separately from the vacuum pipeline to the mandrel block 7, so that vacuum suction and pressure-air blowing can be effected.

A similar effect may be obtained if an ejector pin is upwardly ejectably disposed on the top of the mandrel block 7.

Cup delivery stage

Figure 14:
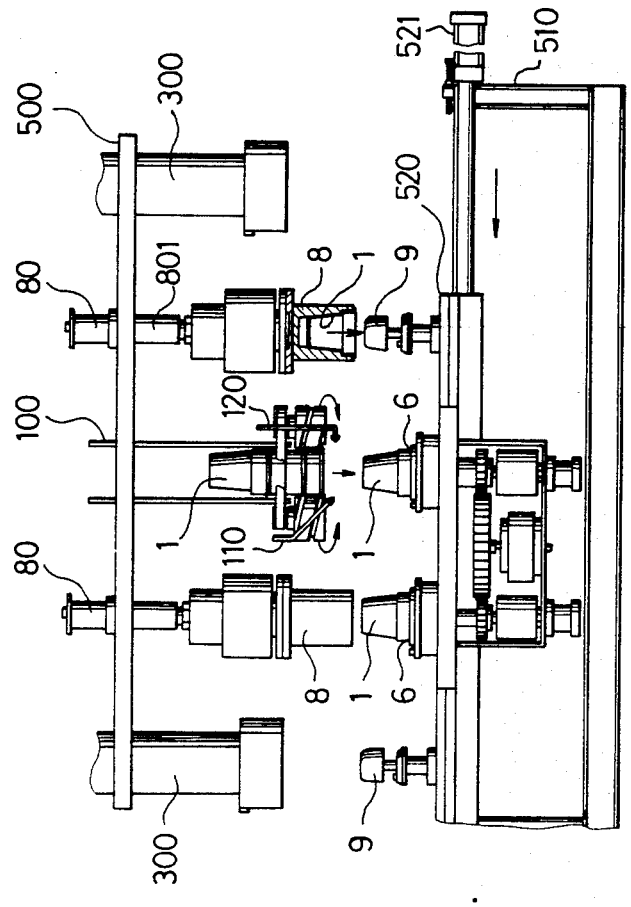

As can be seen from the general view of relevant unit mechanism in FIG. 14, the moving table 520 is actuated to move so that a product receiver 9 is positioned under the cavity block 8. Whilst, the mandrel block 7 and lip forming tool 6 are again positioned under the spiral feeder 100 and cup supply is resumed for next cycle of lip formation. As above mentioned, operating stages progress with some time lag between unit apparatuses.

Like the mandrel block 7, the product receiver 9 has such configuration as will permit its engagement with the interior of the cup 1. The receiver 9 is mounted on the moving table 520, being secured thereto by bolts or otherwise. On the product receiver 9 there are provided pressure-air blow holes 95. Since the product receiver 9 is simply for transfer of cup 1, it need not be of such precise configuration as will permit close engagment with the interior of cup 1; it may be of a rough configuration inasmuch as it can hold the cup 1.

When the cavity 8 is positioned above the product receiver 9, the cup 1 held by vacuum suction in the recess 80 is caused to drop downward by removing the vacuum suction. The cup 1, as it is dropped, is received by the product receiver and held in engagement therewith.

Collecting stage

Figure 15:
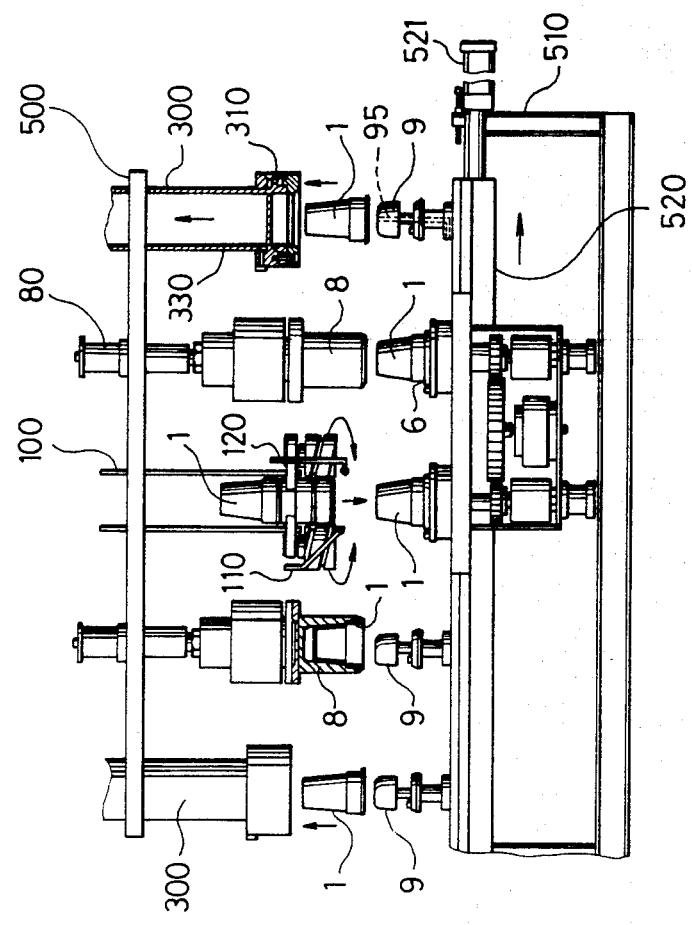

As FIG. 15 illustrates, the moving table 520 resumes movement to position the product receiver 9 at a location under the air chuter 300. With this condition kept as it is, the mandrel 7 and lip forming tool 6 are positioned under the cavity block 8, and next cycle of bending-line forming operation is performed. Whilst, cup 1 is fed to the mandrel block on the left-hand side by the spiral feeder 100 for initiation of next cycle of operation.

The air chuter 300 has at its lower end a suction ring 310 and a chuter pipe 330 connected thereto, said chuter pipe 330 being introduced into the collecting station for cups 1.

Pressure air is blown up from the pressure air blow hole 95 to blow cup 1 upward, whereupon the cup 1 is sucked through the suction ring 310 for transfer to the collecting station via the chuter pipe 330.

The above described collecting mechanism is simply such that cup 1 having a lip 20 formed thereon is collected by means of product receiver 9 and air chuter 300. Therefore, instead of air chuter 300 it is possible to use any other known mechanism, such as a conveyor mechanism, a vacuum suction pad, or a cup holding arm, for collection of cups 1 from the product receiver into the collecting station.

It is also possible to collect cups 1 by means of conveyor mechanism or the like directly from the cavity block 8, without provision of product receiver 9.

The process of forming a lip on a cup 1 is completed through the above described stages. For effective utilization of the entire apparatus, however, operation can be advantageously carried out by feeding cups 1 alternately to a pair of mandrel 7 right and left, along with the rightward and leftward movement of the moving table 520, and actuating pairs of lip forming tools 6 and other means to perform relevant works in subsequent stages on an alternate basis. Thus, operation at the sequential stages will progress with some time lag between the right and left units of apparatus. In this way, pairs of operating elements, such as lip forming tools 6, arranged on the moving table 520 can be most effectively used. Accordingly, cups 1 having lips 20 formed thereon can be continuously collected through a pair of air chuters 300, right and left. Efficient production can be thus assured.

The arrangement of the apparatus, in addition to that shown above, may take such a pattern that the group of operating elements disposed at a higher level, including spiral feeder 100, cavity block 8, and air chuter 300, are arranged in an annular pattern, while the group of operating elements disposed at a lower level, including mandrel block 7, lip forming tool 6, and product receiver 9, are arranged in an annular pattern on a disc-shaped moving table powered by motor or the like. Such arrangement will permit the mandrel block 7, etc. to move upward to a position under the spiral feeder 100 or the like sequentially as the disc-shaped moving table rotates.

It is also possible to dispose the spiral feeder 100, etc. in vertically opposed relation with the mandrel block 7, etc. In another embodiment, the spiral feeder 100, etc. may be disposed in laterally opposed relation with the mandrel block 7, etc. In this case, however, some dependable transfer mechanism must be provided for transfer of cup 1 from the spiral feeder 100 to the mandrel block 7 and also from the cavity block 8 to the product receiver 9, since transfer through natural dropping is not possible.

Again, it is possible to dispose the cavity block 8, etc. at the lower level and the mandrel block 7, etc. at the higher level. The overall arrangement of the apparatus may be varied without departing from the scope of the invention.

Figure 16:
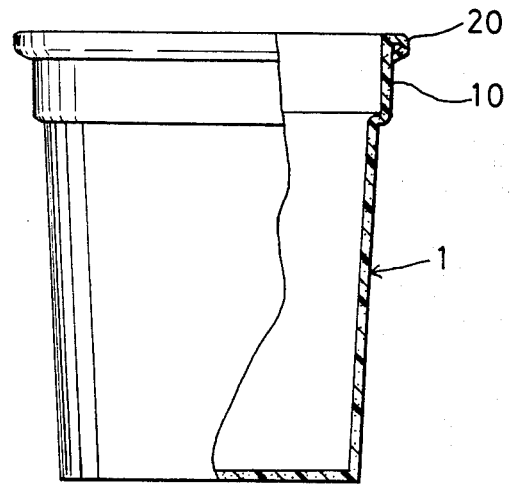
Figure 17:
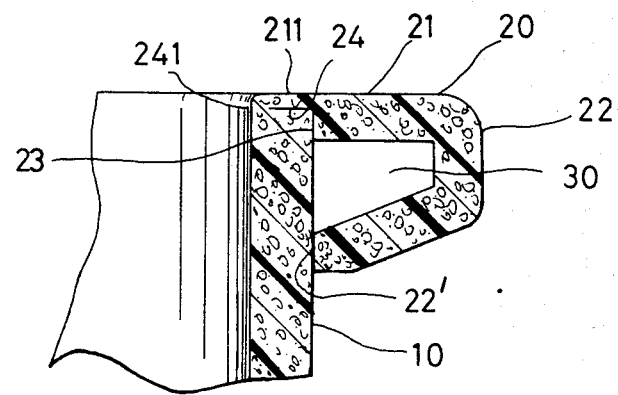

A cup 1 having a lip 20 as produced through these stages of operation is illustrated in FIGS. 16 and 17.

As the upper end of the upper side wall portion 10, the cup 1 has a projection 21 bent from the preserved thin wall portion 241 substantially rectangularly thereto. Therefore, the cup 1 has an accurate lip configuration, high dimensional accuracy, and high compression strength in the horizontal direction.

It is specifically noted that the projection 21 and the upper side wall portion 10 are in engagement with each other at lines 23 and 24 which define an L shape. This accounts for good stability of the lip configuration. The lip 20 as a whole has no thin-walled portion, which is advantageous from the view point of strength characteristics.

An example of working in accordance with the above described method and embodiment of the invention will be explained below.

A cup blank 1 having the following configuration and dimensions was prepared: rim 20' outer diameter 76 mm, overall cup height 83.5 mm, and rim 20' width 3.5 mm. The extension of the rim 20' from its top to the end of its curved portion 22' was 2.5 mm. a bending groove 50, about 1.5 mm wide, as a bending furrow was formed 3.5 mm below the upper end of the rim 20'.

The cup 1 was subjected to bending by being pressed against a forming groove 60, about 2.5 mm wide and about 2.5 mm deep. As a result, the cup 1 was formed into one having a lip 20, 3.5 mm wide and 3.5 mm high, and a total length of 80.0 mm. The lip 20 was found satisfactory.

Nextly, a modification illustrated in FIGS. 18 to 20 will be explained. This modification is different from the above described method in that a bending groove 56 of trapezoidal shape is formed as shown in FIG. 18, instead of the rectangular bending groove 50.

In the stage of bending, as FIG. 19 shows, bending is made along the bottom 560 of the groove 56. Thus, the bottom 560 of the bending groove 56 is compressed and oblique side walls 561, 562 are brought in contact with each other to form a line 57.

The lip 20 thus formed, as FIG. 20 shows, has a projecting portion 25 extending obliquely upwardly from line 57 and relative to the vertical side wall 10. The end 22' of the curved portion 22 of the lip 20 is opposed to the side wall 10, with a clearance between it and the side wall 10.

The lip 20 in this modification is such that when compression force is applied to the cup 1 in the horizontal direction, the tensile stress caused to the lip 20 is distributed over the entirety of the included projection portion 25 and curved portion 22. Thus, this modification is advantageous in resistance to compression crack or breaking when compared with the first embodiment.

In the above modification, the configuration of the hot blade 4 used in forming the trapezoidal bending groove 56 is such that the front end of the blade is rectangular.

When such hot blade having a rectangular configuration is used for hot-melt forming, the outer peripheral side of the bending groove 56 is more substantially heat-melted, thus a bending groove 56 of such trapezoidal shape can be formed.

Another embodiment is illustrated in FIGS. 21 to 24. The modification is explained mainly with respect to its differences from the above embodiment.

Figure 21:
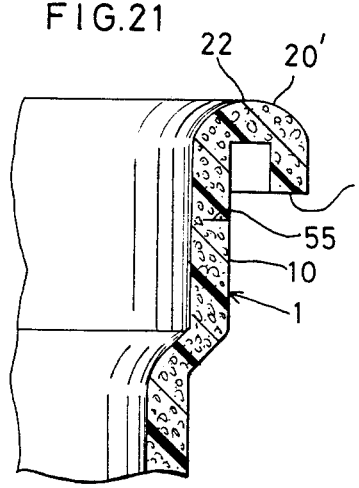
FIGS. 21 to 24 illustrate other forms of modification.

In this modification, as FIG. 21 shows, a linear notch 55 cut by a cutting blade constitutes the bending furrow, instead of the bending groove heat-melt formed by the hot blade 4.

Figure 22:
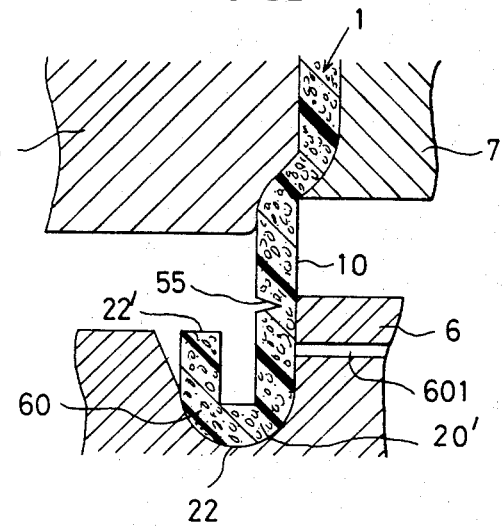

The notch 55 is expanded into a V-shaped by being heated in the forming groove 60 of the lip forming tool 6, as can be seen in FIG. 22.

Figure 23:
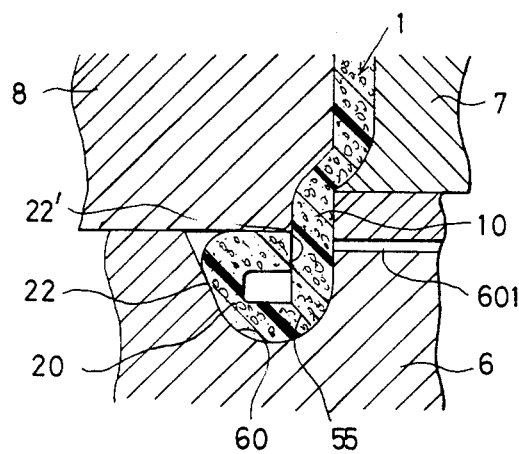
Figure 24:
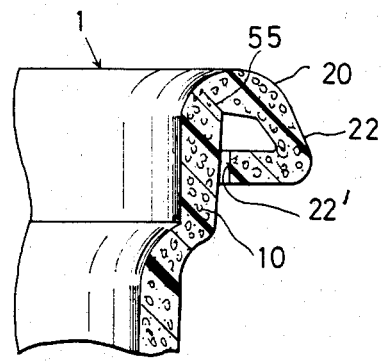

In the subsequent stage of bending as shown in FIG. 23, the rim 20' is bent along the notch 55, whereby the notch 55 is closed into a linear form, a lip 20 being thus formed.

In this modification, for the purpose of applying lubricant to the rim 20', about 0.2 cc or less of diluted silicone water (100 times diluted), heated to about 90° C., is supplied through a lubricant feed hole 601 provided in the forming groove 60.

Supply of lubricant to the bending groove 60 is also effectively applicable in the above described case where a rectangular bending groove 50 is formed and the case where a bending groove 56 is trapezoidal shape is formed.

In the above modification, the configuration of curved portion 22 of the preformed rim 20' is different from that of the curved portion 22 of the formed lip 20. In this way, it is possible to effect a further deformation on the lip being formed as compared with the configuration of the rim 20'.

It is readily apparent that the above-detailed method and apparatus for manufacturing cups having a lip meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of manufacturing cups having a lip, which comprises the steps of:
    (a) forming a pre-formed up from a thermoplastic resin foamed sheet material, the side wall and bottom of the preformed cup being formed integrally at a molding temperature above the softening point of the foamed sheet material, a radially outwardly extending rim provided at the top of an opening defined by the side wall, said rim extending substantially downwardly at the end thereof,
    (b) heating the side wall to a temperature within a range of temperatures above the heat deformation temperature for the material and below said molding temperature,
    (c) melt-forming a bending furrow on the outer periphery of the side wall, and
    (d) bending the rim on said bending furrow outwardly and down and turning the end of the rim toward the side wall.

2. A method of manufacturing cups having a lip as set forth in claim 1, wherein said step of forming a bending furrow is carried out subsequently to the step of heating.

3. A method of manufacturing cups having a lip as set forth in claim 1, wherein said step of heating and said step of forming a bending furrow are simultaneously carried out.

4. A method of manufacturing cups having a lip as set forth in claim 1, wherein said step of heating is carried out subsequently to the step of forming a bending furrow.

5. A method of manufacturing cups having a lip as set forth in claim 1, wherein the rim of the cup is bent by being pressed against a lip forming groove.

6. A method of manufacturing cups having a lip as set forth in claim 1, further comprising applying a lubricant to the rim prior to the step of bending.

7. A method of manufacturing cups having a lip as set forth in claim 1, wherein the bending furrow is a groove.

8. A method of manufacturing cups having a lip as set forth in claim 7, wherein the configuration of the groove is rectangular.

9. A method of manufacturing cups having a lip as set forth in claim 8, wherein the groove width is preferably 0.1–0.3 mm longer than the groove depth.

10. A method of manufacturing cups having a lip as set forth in claim 1, wherein the bending furrow is a notch.

11. An apparatus for manufacturing cups having a lip, including means for forming a lip on a pre-formed cup made from a thermoplastic resin formed sheet material and having a side wall and a bottom integrally formed therewith and a radially outwardly extending rim provided at the top of an opening defined by the side wall, said means comprising cup supply means for feeding the pre-formed cup, cup holding means being rotatable and axially slidable as it holds the pre-formed cup for holding each pre-formed cup, bending-line forming means movable toward the pre-formed cup held by the cup holding means and adapted to melt-form a bending furrow on the outer periphery of the side wall of the pre-formed cup, lip forming means having a lip forming groove adapted to receive the rim of the cup and provided with heating means, and cup removal means for removing the cup from the cup holding means.

12. An apparatus for manufacturing cups having a lip as set forth in claim 11, wherein said cup removal means comprises a cavity block axially slidable and adapted to fit over the outer perphery of the cup and to hold the cup therein.

13. An apparatus for manufacturing cups having a lip as set forth in claim 11, wherein said bending-line forming means is a blade.

14. An apparatus for manufacturing cups having a lip as set forth in claim 13, wherein the blade is a hot blade.

15. An apparatus for manufacturing cups having a lip as set forth in claim 14, wherein the configuration of the hot blade is rectangular.

* * * * *